Oct. 30, 1934.  C. M. EASON ET AL  1,978,451

JACK

Filed Oct. 30, 1933  4 Sheets-Sheet 1

Inventors:
Clarence M. Eason
Joseph J. Mueller
By: Brown, Jackson, Boettcher & Dienner,
Attys.

Oct. 30, 1934.  C. M. EASON ET AL  1,978,451
JACK
Filed Oct. 30, 1933  4 Sheets-Sheet 2

Inventors:
Clarence M. Eason
Joseph J. Mueller
By: Brown, Jackson, Boettcher & Dienner.
Attys.

Oct. 30, 1934.　　　C. M. EASON ET AL．　　　1,978,451
JACK
Filed Oct. 30, 1933　　　4 Sheets-Sheet 3
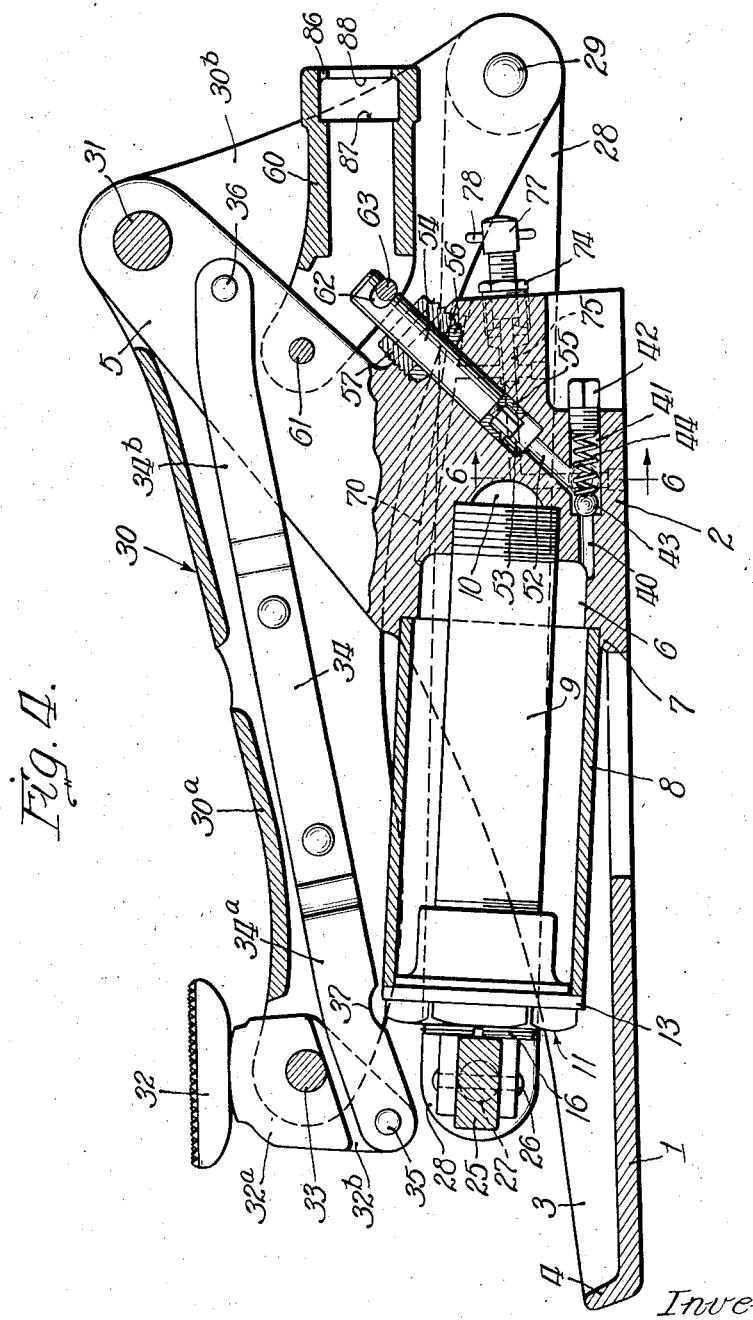
Inventors:
Clarence M. Eason
Joseph J. Mueller
By: Brown, Jackson, Boettcher & Dienner,
Attys.

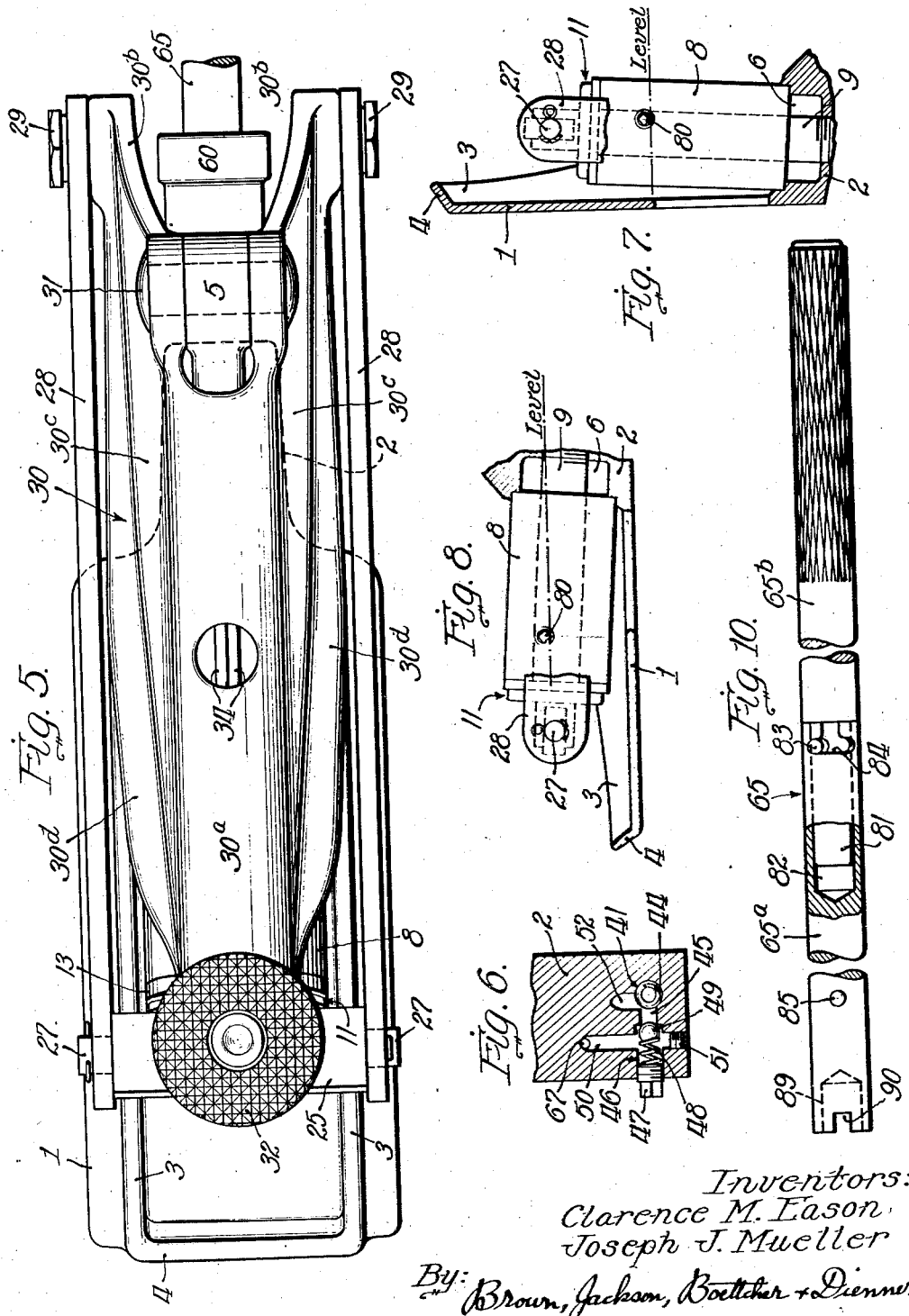

Patented Oct. 30, 1934

1,978,451

UNITED STATES PATENT OFFICE 1,978,451

JACK

Clarence M. Eason, Waukesha, and Joseph J. Mueller, Racine, Wis., assignors to Hein-Werner Motor Parts Corporation, Waukesha, Wis., a corporation of Wisconsin Application October 30, 1933, Serial No. 695,732

9 Claims. (Cl. 254—93)

This invention relates to jacks, and has to do with hydraulic jacks specially intended for use with automobiles and like vehicles.

The present tendency of the automobile industry is to use tires of large section, known as air wheels or super-balloon tires. When one of these tires is punctured, the axle of the automobile drops down to within a short distance of the ground, the clearance between the axle and the ground being so slight that it is impossible to position a jack of the ordinary ratchet type beneath the axle. This necessitates the use of a jack with exceptionally low initial head room and which has the ability to lift the axle sufficiently high above the ground or supporting surface to permit of placing an inflated tire upon the wheel.

It has been attempted to solve this difficulty by providing jacks using pistons of telescoping construction. These jacks are open to the objection that it is extremely difficult to maintain the sections of the piston properly packed so as to prevent leakage, in the case of a hydraulic jack, and are open to the further objection that the piston, when extended, offers little resistance to lateral bending, which bending of one or more of the sections of the piston ruins the jack and renders further use thereof impossible.

One of the main objects of our invention is to provide a jack of comparatively light weight and simple construction, which possesses ample power for the purposes intended and has exceptionally low initial head room so as to be accommodated in spaces having but slight clearance. A further object is to provide a hydraulic jack which is unvented and is effectively sealed at all times against leakage of the liquid used in the jack. It is also an object of our invention to provide a jack in which outward movement of the ram member beyond a predetermined position is prevented without subjecting the jack to excessive strains such as would possibly result in breakage of parts. Further objects and advantages of our invention will appear from the detail description.

In the drawings:—

Figure 4 is a section taken substantially on line 4—4 of Figure 2, parts being shown in elevation;

Figure 5 is a plan view of the jack;

Figure 6 is a section taken substantially on line 6—6 of Figure 4;

Figure 7 is a side view of the jack, partly in section and with parts broken away, in the position which it occupies when the operating liquid is supplied to the reservoir;

Figure 8 is a view similar to Figure 7, but with the jack disposed in normal operating position, the normal level of the operating liquid in the reservoir being indicated;

Figure 10 is an elevational view of the jack operating handle, partially broken away and in section.

Figure 1:
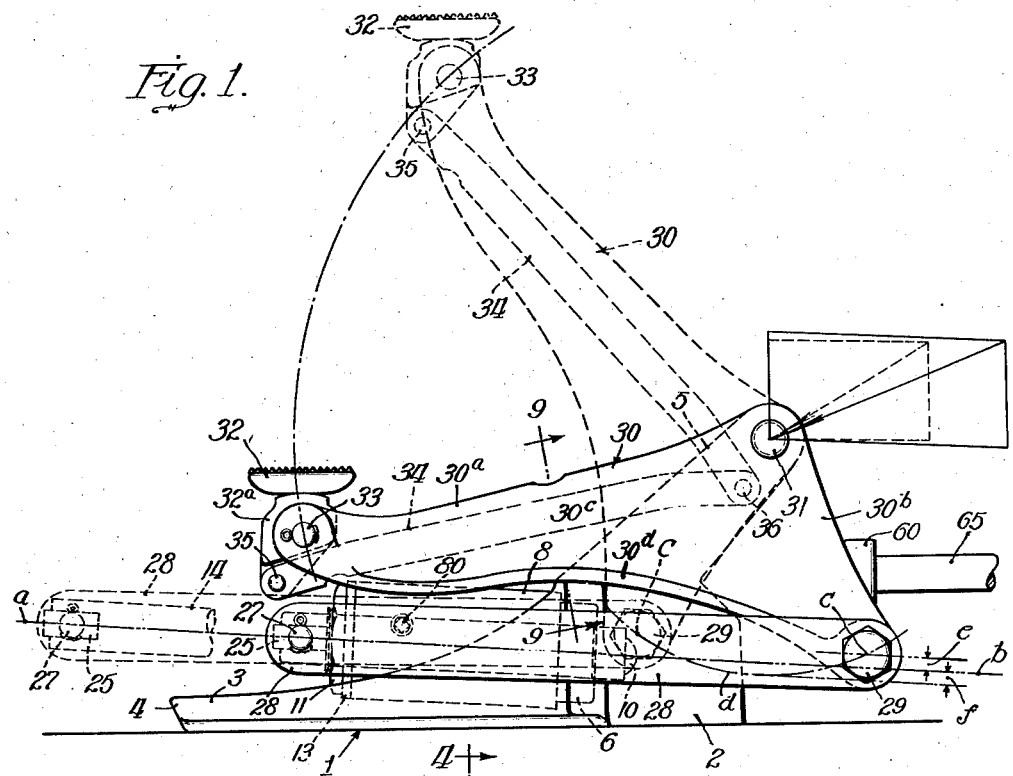
Figure 1 is a side view of a jack embodying our invention, the relative positions of the lifting lever and associated parts, when the lever is in full lowered position, being shown in full lines, and the relative positions of these parts, when the lever is in full raised position, being shown in dotted lines.
Figure 2:
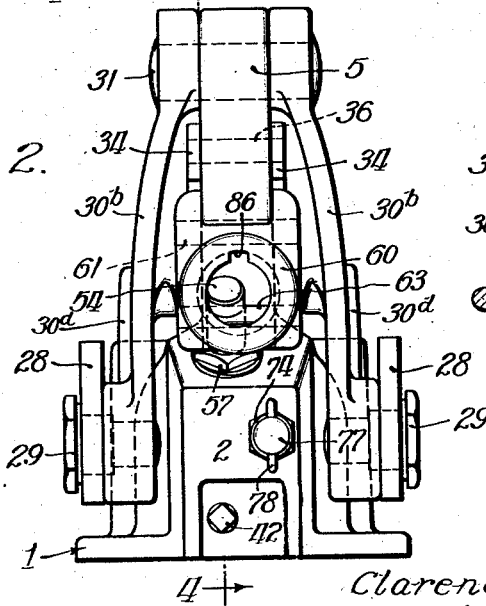
Figure 2 is an end view of the jack, viewed from the pump end.

The jack of our invention comprises a base member 1 in the form of a flat plate of rectangular shape in plan, this base member being provided, adjacent one end thereof, with an upwardly extending block 2. Web elements 3 extend along each side of the base member toward the other end thereof from the block and are connected, at their outer ends, by a cross flange 4, this flange, as well as the web elements and the block 2 preferably being formed integral with the base member. This base member, beyond the block 2, is thus of channel cross-section and possesses great strength. A supporting arm 5 is formed integral with the block 2 and extends upwardly therefrom, this arm being inclined downward toward the block at an angle of approximately 45 degrees to the base member 1. The base member 1 and the block 2, together with the web elements 3, flange 4 and supporting arm 5, constitutes a unit of simple construction which possesses great strength and can be cast with facility from malleable iron or other suitable metal possessing the required strength.

Block 2 is provided, in its rearward face, with two concentric cylindrical recesses 6 and 7, recess 7 being of greater diameter than recess 6. A cylindrical reservoir member 8 seats at its inner end in recess 7 and extends from block 2 lengthwise of base member 1 and at a slight upward inclination from the block toward the remote end of the base member.

The block 2 is suitably bored and threaded centrally of recess 6 for reception of the threaded inner end of a cylinder 9 which screws into the block and is thus secured thereto. A rounded chamber 10 is formed in the block 2 and opens directly into the inner end of cylinder 9. A flanged cylindrical head 11, provided with an interiorly threaded neck 12, screws onto the outer end of cylinder 9, flange 13 of this head bearing against the outer end of the reservoir member 8. Head 11 cooperates with the cylinder 9 for securing the reservoir member 8 tightly in position and effecting fluid tight closures at the ends thereof, it being noted that the head fits tightly into the outer end of member 8, the inner end of which fits tightly into the recess 7. The head 11 also serves to close the space between the outer end of the reservoir member and the cylinder 9.

Figure 3:
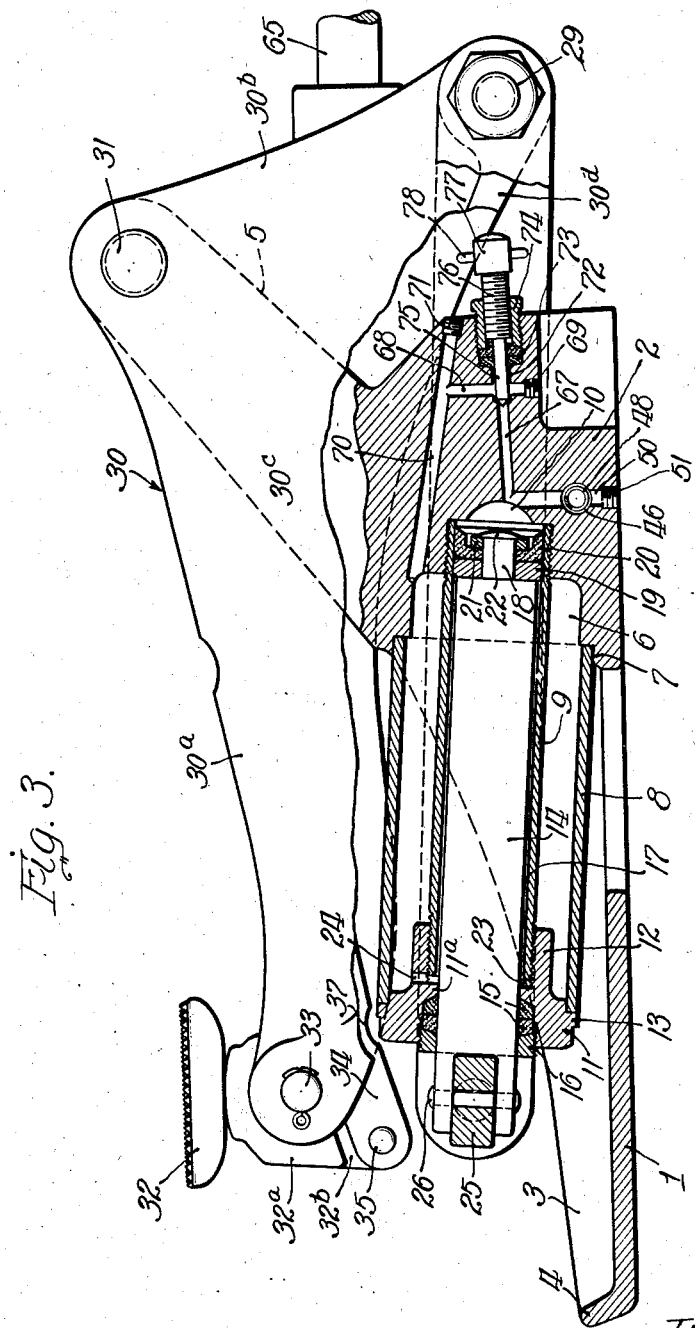
Figure 3 is a side view of the jack, on an enlarged scale, partly broken away and in section, parts being shown in elevation.

A ram 14 operates in the cylinder 9 and through the head 11, which head is suitably bored to accommodate the ram and to provide a space thereabout for receiving suitable packing 15, compressed by means of a packing nut 16 which screws into the head 11 from the outer end of the latter. This provides a stuffing box structure about the ram effective to prevent leakage of air to the interior of the cylinder. The ram 14 is of less diameter than the interior of cylinder 9 (Figure 3) so as to leave a space 17 between the ram and the inner surface of the cylinder. A reduced stud 18 extends from the inner end of ram 14 and through a disc 19 which abuts the inner end of the ram and fits the interior of the cylinder snugly. The stud 18 also passes through a leather cup 20 disposed at the inner face of disc 19, and a washer 21 at the inner face of the cup, the inner end of stud 18 being headed at 22 for securing the washer 21, cup 20 and disc 19 in position upon the stud. The outer end of cylinder 9 terminates short of the inner face of head 11 so as to leave a space 23 between the outer end of the cylinder and the inner face of the head. This space 23 communicates with an opening 24 through neck 12 of the cylinder, the space 17 between the ram 14 and the inner surface of cylinder 9 thus being in communication with the interior of the reservoir member 8.

Ram 14 is provided, at its outer end, with a diametrical slot which receives a cross-head 25 suitably secured in the end of the ram, as by means of a pin 26. This cross-head is provided, at each end thereof, with a stud 27 (Figure 5) which passes through the end of a relatively long link 28, these links being disposed at the outer faces of and adjacent the web elements 3. Links 28 are pivoted, at their other ends, by means of shouldered screws 29, to power arm 30b of a lifting lever 30, which lever is pivotally mounted, by means of pin 31, on supporting arm 5 adjacent the upper end thereof. The lever 30 comprises a lift arm 30a which, in the inoperative or normal position of the lever, extends lengthwise of the base member adjacent and substantially parallel to reservoir member 8, and the power arm 30b which extends downward from the fulcrum, the pivot screws 29 screwing into this power arm at the lower end thereof. Arm 30a of the lever is approximately twice as long as power arm 30b and is disposed substantially at right angles thereto. In the lifting operation, the force applied to arm 30b is equal to approximately twice the downward force exerted by arm 30a and, since the two arms of the lever are disposed substantially at right angles to each other, the resultant of these two forces will be exerted downward at an angle of approximately 30 degrees to the base member 1, that is, approximately parallel to the supporting member or arm 5. This will be clear from Figure 1, in which the parallelogram of forces and the resultant thereof, at the start of the lifting operation, is shown in full lines, and the parallelogram of forces and the resultant thereof, at the completion of the lifting operation, is indicated by dotted lines. It will thus be seen that, in the main, the stresses to which the supporting arm 5 is subjected in the use of the jack are compressive stresses, whereby fracture of this member is prevented and the supporting member is rendered capable of supporting exceptionally heavy loads. It will further be noted that, when the lever 30 is in its lowered position, the jack as a whole possesses exceptionally low head room, particularly at the end of the lever remote from the fulcrum or pivot pin 31.

Figure 9:
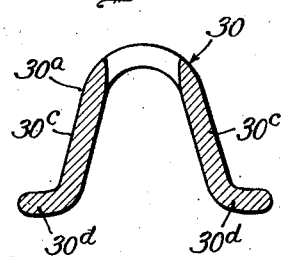
Figure 9 is a transverse sectional view of the lift arm of the jack taken substantially along the line 9—9 of Figure 1.

Arm 30a of the lever 30 is preferably constructed substantially channel or U-shaped in cross-section as is best illustrated in Figure 9. The vertical dimension of the channel constituting arm 30a varies in degree, gradually increasing from the outer end of the arm toward the fulcrum 31 thereof, the channel having its greatest depth substantially at this point since the greatest shearing stresses are here encountered. The side walls 30c, see Figures 3 and 9, of the channel arm 30a are extended beyond the fulcrum point 31 and downwardly therefrom to form the elements comprising the power arm 30b of the jack. In addition, channel arm 30a is flanged as at 30d, see Figures 1 and 9, the flanges extending along the bottom edges of arm 30a beyond the fulcrum point 31 and along the edges of the elements of the power arm 30b, terminating at the outer or extended ends of said elements respectively. With a jack lever constructed in the manner described, enormous vertically shearing stresses can be accommodated because of the channel form of the lever 30, the flanges 30d on the latter further increasing the strength and durability thereof by adequately counteracting any side thrust that may occur in a direction parallel to the fulcrum or pivot pin 31. With this construction the lever 30 as a whole comprises a lever which possesses maximum strength for the amount of available metal therein, the lever being relatively light in weight but entirely capable of supporting exceptionally heavy loads.

A lifting pad 32 of known or any suitable type, is pivotally mounted on a horizontal axis in the outer end of arm 30a, by means of studs 33 which project from neck 32a of pad 32 and extend through the side walls of arm 30a. Lower portion 32b of neck 32a of the pad is reduced for reception of a fork 34a at the outer end of a link 34, this link being provided at its inner end with a fork 34b which straddles arm or supporting member 5. Fork 34a is pivoted to portion 32b of neck 32a by a pin 35, fork 34b being pivoted to arm 5 by a pin 36. Fork 34a is provided with a suitable recess 37 to clear the reservoir member and head 11, when arm 30 is in its lowermost position shown in Figure 4. The link 34 serves to maintain lifting pad 32 in horizontal position in the movement of lifting arm 30, in a known manner.

Block 2 is provided with a duct 40 extending from the lowermost portion of recess 6 and opening into an enlarged bore 41 extending from the opposite face of the block, the outer end of this bore being closed by a screw plug 42. The outer end of duct 40 is suitably shaped to provide a seat for a ball valve 43 yieldingly held seated by an expansion coil spring 44 disposed within duct 41 and confined between the valve and plug 42, as shown in Figure 4. A cross passage 45 (Figure 6) connects duct 41 to a bore 46 extending into the block 2 from the side thereof opposite to bore 41. The outer end of bore 46 is closed by a screw plug 47 against the inner end of which bears an expansion coil spring 48 disposed within bore 46, the inner end of this spring bearing against a ball valve 49 which controls communication between passage 45 and duct 46. A duct 50, bored from the under face of block 2, intersects bore 46 and opens at its upper end into chamber 10, the lower end of this duct being closed by a screw plug 51. A passage 52 establishes communication between bore 41 and a cylindrical bore 53, of increased diameter, which extends downward in block 2 from the upper and outer portion thereof, this bore 53 being disposed adjacent and substantially parallel to the supporting member or arm 5. The bore 53 provides a pump cylinder in which operates a plunger 54 provided at its lower end with a leather cup 55 secured upon the plunger in a suitable manner. Block 2 is suitably bored and threaded, at the upper end of bore 53, for reception of suitable packing 56 and a packing nut 57, disposed about the plunger 54 and providing a stuffing box effective to prevent leakage about the plunger.

A handle receiving socket member 60 is pivoted at 61 upon arm 5 and straddles the lower portion thereof. Plunger 54 extends upward between the arms of the socket member and is provided, adjacent its upper end, with a slot 62 which receives a pin 63 secured through the socket member transversely thereof. The socket member is adapted for reception of a suitable handle 65 (Figure 10). Handle 65 is preferably made in two sections 65a and 65b as illustrated in Figure 10, section 65b having a shank 81 of reduced diameter insertible into a socket 82 in section 65a. A pin 83 is carried by the shank 81 and cooperates with a T-slot 84 to hold the two sections 65a and 65b in operative relation. A pin 85 is secured to section 65a of the handle so that the latter may be inserted into the socket member 60 of the jack with the pin 85 passing through the notch 86 in the socket until the pin strikes the shoulder 87. Upon turning the rod or handle 65 somewhat, the pin then prevents retraction of the rod during operation of the jack because of engagement with the ledge 88 of the socket 60. The rod may subsequently be rotated upon its axis to bring the pin 85 into registry with the notch 86 whereupon the rod may be withdrawn from the socket.

In addition, section 65a of the handle or rod has its free end bored out as at 89 and notched as at 90 to permit slipping the rod over the head 77 of the valve 75 with the notches 90 receiving the end portions of the pin 78 therein. The rod may thus be employed for opening or closing the valve 75 as the case may be, the function of valve 75 being hereinafter explained. It is evident that the T-slot 84 and pin 83 cooperate in such a manner as to prevent separation of sections 65a and 65b while the handle or rod is being inserted into socket 60 or removed therefrom, and, also, when the rod is being employed to open or close valve 75.

The handle 65 is preferably of appreciable length and possesses sufficient resiliency to permit of downward flexing of the handle into contact with the ground or supporting surface, in the event that the ram 14 is moved outward in the cylinder to such an extent that the disc 19 contacts element 11a of head 11, it being noted that this element 11a fits snugly about ram 14 and, accordingly, is disposed in the path of outward movement of the outer portion of disc 19. In such event, the flexing of the handle is effective to prevent excessive stresses being imposed upon the disc 19 and element 11a, with possible breakage of parts, at such times as the ram may be moved to this extreme outer position. It will also be noted that the disc 19 and element 11a cooperate to prevent the ram from being forced completely out of the cylinder 9. Under normal operating conditions, however, the ram cannot move outward in the cylinder 9 a sufficient distance to bring disc 19 into contact with element 11a, as will be described presently.

Block 2 is further provided with a duct 67, the inner end of which intersects the upper end of duct 50 and opens into chamber 10. Duct 67 opens, at its outer end, into a duct 68, the lower end which is closed by a screw plug 69, and the upper end of duct 68 opens into a duct 70 closed at its outer end by a screw plug 71 and opening, at its inner end, into recess 6 at the upper portion thereof. A short duct 72 extends outward from duct 68 in alignment with duct 67, and the block is suitably bored and threaded about the outer end of duct 72 for reception of suitable packing 73 and a packing nut 74, by means of which the packing is compressed, so as to provide a fluid-tight closure about a needle valve 75 extending through duct 72, this valve controlling duct 67 at the outer end of which is provided a tapered seat cooperating with the tapered inner end or point of valve 75. Nut 74 is interiorly threaded and cooperates with a similarly threaded stem 76 of valve 75, this stem being provided, at its outer end, with a head 77 from which project the end portions of a pin 78 secured through the head diametrically thereof. This provides convenient means for operating the valve by means of a suitable tool having a socket element adapted for insertion over the head 77 and to contact the end portions of pin 78 for rotating the valve. The valve 75 is normally held in its closed position shown in Figure 3, rotation of the valve in proper direction serving to close or open the outer end of duct 67, as required and as will be readily understood.

Since the reservoir for containing the liquid and the cylinder 9 are sealed against admission of air, a partial vacuum will be produced in the reservoir as the liquid is withdrawn therefrom in the operation of the pump. The space in the reservoir and the amount of liquid and the displacement volume of the ram are so proportioned that the partial vacuum within the reservoir will be of such value, as the ram approaches its outermost position, that the difference in the partial vacuum within the reservoir and the partial vacuum within the pump cylinder, when the pump piston reaches the limit of its outstroke, is equal to the unit loading on the pump inlet valve, at which time this valve remains closed to prevent flow of liquid into the pump. Accordingly, when the ram reaches this predetermined position in its outward travel, continued operation of the pump is ineffective for forcing liquid into the cylinder, and the ram remains in this position even though the pump may be operated. This is advantageous as avoiding subjecting the jack to objectionable stresses, such as would occur if the pump were effective for forcing liquid into the cylinder after the ram reached the predetermined outer position referred to. It will also be noted that we avoid, in this manner, any necessity for venting the reservoir. Consequently, the reservoir remains sealed liquid tight at all times and there is no danger of liquid leaking from the reservoir in any position of the jack when it is being carried in the automobile. This is advantageous as assuring that the proper amount of liquid remains in the reservoir at all times while avoiding inconvenience due to leakage of the liquid. In order to obtain the desired partial vacuum when the ram reaches its predetermined outermost position, the volume of liquid in the reservoir should be equal to approximately 133 per cent of the volume of the ram cylinder displacement, and the air space within the reservoir should be equal to approximately 66 per cent of the displacement volume of the ram; when the lifting lever 30 is in its lowermost position with ram 14 disposed in its innermost position. The proportions stated are approximate and may be varied within limits, provided a partial vacuum is produced in the reservoir of proper value to prevent flow of oil or liquid to the pump and thereby stop outward movement of the ram, as the ram approaches its outermost position.

In the operation of the pump, liquid, preferably oil, is withdrawn from the lower portion of the reservoir through the duct 40 and is forced into the cylinder through cross passage 49 and duct 50, thus forcing the ram 14 outward in the cylinder 9. This swings arm 30a of lever 30 upward so as to raise the load, in the manner previously described. When it is desired to lower the load, valve 75 is opened to the proper extent for lowering the load at the desired rate, the oil being then expelled from cylinder 9 through ducts 67, 68 and 70 into the reservoir space where it is stored for use. In the event of slight lateral movement of the ram 14, one or the other of the relatively long links 28 will contact the adjacent web 3, thus effectively preventing objectionable lateral movement of the ram. In this connection, we contemplate disposing the links in contact with the outer sides of the webs 3, if desired, though under ordinary conditions this is not necessary. Any oil which may enter the space 17, either through the opening 24 or by flowing past the cup 20 and disc 19, will be subjected to the partial vacuum created in the reservoir during operation of the jack. Accordingly, this oil will flow through the opening 24 into the interior of the reservoir member 8, rather than around the ram 14 and past the packing 15. This is advantageous as preventing leakage of oil around the ram in the operation of the jack, while also reducing any possible tendency to leakage of the oil about the ends of the reservoir member 8.

The slight inclination of the reservoir member 8 and the cylinder 9 is advantageous when using the jack on soft ground, particularly, in that it assures that the ram and the cross-head will clear the ground or supporting surface if the adjacent portion of the base member 1 sinks a short distance into the ground. This is true also if the entire base member sinks to an appreciable depth in soft ground or other soft supporting surface. In either case, the inclination of the cylinder assures that the ram will clear the supporting surface sufficiently to permit of proper operation of the jack.

The axis of cylinder 9 and of ram 14, indicated by line a—b in Figure 1, is so disposed that it approximately bisects the vertical distance through which the axis of the pivotal connection between the links and the power arm, designated c in Figure 1, is moved down in the operation of the jack. Referring to Figure 1, the lowermost point of the downward travel of pivot axis c is indicated by d. The vertical distance between c and b, indicated by e, is equal to the vertical distance between b and e, indicated by f. It will also be noted that the distance of the point c above the line a—b, when the lifting lever is in its highest position, is appreciably less than the vertical distance e plus f. By thus relating the axis of the cylinder and the ram to the pivot point of the connection between the links and the power arm of the lever, and using relatively long links, the transverse vertical stresses to which the ram may be subjected are reduced to a minimum, the resulting stresses not being objectionable in extent and having no appreciable tendency to bend the ram either upward or downward. This avoids all necessity for providing a guide for the cross-head of the ram, which renders the construction of the jack lighter and less cumbersome than would otherwise be the case.

In order to assure the proper amount of liquid within the reservoir member 8, we provide this member with a properly disposed filling opening normally closed air tight by a screw plug 80. With the jack disposed vertically, as in Figure 7, and the ram 14 in its innermost position, oil is poured into the reservoir until it reaches the lower edge of the filling opening. The level of the oil at that time is indicated by the "level" line. The screw plug is then replaced and the jack is ready for use. In the normal operative position of the jack, the oil level, when the ram is in its innermost position, approximately corresponds to the "level" line of Figure 8. In this connection, we also contemplate disposing the plug 80 in such a position as to permit filling the reservoir member 8 to the preferred level, as gauged by the plug opening, either when the jack is held upright as in Figure 7 or when it is disposed in a horizontal position as portrayed by Figure 8. It will be understood that the proportions between the volume of liquid, the air space within the reservoir, and the displacement volume of the ram, may vary somewhat, within limits and in view of the characteristics of the particular liquid employed, though we have found that the proportions stated are satisfactory and give the desired results when oil such as is commonly used in hydraulic jacks is employed.

What we claim is:—

1. In a hydraulic jack, a base member provided with an upwardly projecting cylinder block, a cylinder secured to said block and disposed lengthwise of the base member and at a slight inclination downward toward the base member and the block, a ram operating in the cylinder, an inclined supporting member extending upward from said block at the transverse center thereof, a lifting lever fulcrumed on said supporting member, and operating connections between said ram and said lever.

2. In a jack, a base member provided adjacent one end with an upwardly projecting block and a supporting member extending upward from the block centrally thereof and inclined downward toward the other end of the base member, a lifting lever fulcrumed on and straddling said supporting member and comprising a lift arm of channel cross-section extending from the fulcrum toward the remote end of the base member and a power arm extending downward from the fulcrum, and operating means comprising an operating member and operating connections between said operating member and said power arm, the operating member being connected to the block for transmitting pressure thereto.

3. In a hydraulic jack, a base member provided with an upwardly projecting block and with lateral upwardly extending webs connecting said block to said base member, a cylinder secured in the block and extending therefrom lengthwise of the base member and between said webs, a ram operating in the cylinder, a supporting member extending upward from the block centrally thereof, a lifting lever of channel cross-section straddling and fulcrumed on said supporting member, and operating connections between said ram and said lever, said connections comprising links extending parallel with and adjacent the webs.

4. In a hydraulic jack, a reservoir member, a cylinder, a ram operating in the cylinder, and pump means for withdrawing a liquid from the reservoir member and forcing it into the cylinder for forcing the ram outward of said cylinder, said reservoir member and said cylinder being sealed against admission of air in the use of the jack, the air and liquid storage space of the reservoir and the ram displacement volume and the amount of liquid being so proportioned that a partial vacuum is created in the reservoir member of proper value to prevent flow of liquid to the pump, when the ram reaches a predetermined position in its outward travel, whereby further outward travel of said ram by continued operation of the pump is prevented.

5. In a hydraulic jack, a base member provided with an integral upwardly projecting cylinder block, a supporting member integral with the block and projecting upwardly therefrom centrally thereof, a lifting lever of approximately inverted U-shape in cross-section straddling and fulcrumed on said supporting member, said lever comprising a lift arm extending from the fulcrum and power arms integral with the lift arm and extending downward from the fulcrum at the sides of the supporting member, a cylinder mounted in the block, a ram operating in the cylinder, and operating connections between said ram and said power arms.

6. In a hydraulic jack, a base member provided with an integral upwardly projecting cylinder block, a supporting member integral with the block and projecting upwardly therefrom centrally thereof, a lifting lever of approximately inverted U-shape in cross-section straddling and fulcrumed on said supporting member, said lever comprising a lift arm extending from the fulcrum and power arms integral with the lift arm and extending downward from the fulcrum at the sides of the supporting member, said lever being provided at the lower edge of each side thereof with an integral outwardly projecting reinforcing flange extending along the lower edges of said arms, a cylinder mounted in the block, a ram operating in the cylinder, and operating connections between said ram and said power arms.

7. In a hydraulic jack, a base member provided with an upwardly projecting cylinder block, a supporting member projecting upwardly from the block centrally thereof, a lifting lever of approximately inverted U-shape in cross-section straddling and fulcrumed on said supporting member, said lever comprising a lift arm extending from the fulcrum and power arms integral with the lift arm and extending downward from the fulcrum at the sides of the supporting member, a lift pad pivotally mounted on the lift arm on an axis extending transversely thereof, a link disposed within the lift arm and having one end pivoted to said pad and its other end pivoted to said supporting member, a cylinder mounted in the block, a ram operating in the cylinder, and operating connections between said ram and said power arms.

8. In a hydraulic jack, a base member provided adjacent one end with an upwardly projecting cylinder block, a supporting member projecting upwardly from the block centrally thereof, a lifting lever of approximately inverted U-shape in cross-section straddling and fulcrumed on said supporting member, said lever comprising a lift arm extending from the fulcrum toward the other end of the base member and power arms integral with the lift arm and extending downward from the fulcrum at the sides of the supporting member, a cylinder rigidly secured in the block and inclined upward therefrom toward said other end of the base member, a ram operating in the cylinder, and operating links connecting said ram and said power arms, said ram being otherwise free from the base member.

9. In a hydraulic jack, a base member provided adjacent one end with an upwardly projecting cylinder block, said base member having lateral webs integral therewith and with said block and extending from the latter toward the other end of the base member and decreasing in height toward said other end, a supporting member projecting upwardly from the block centrally thereof, a lifting lever of approximately inverted U-shape in cross-section straddling and fulcrumed on said supporting member, said lever comprising a lift arm extending from the fulcrum toward said other end of the base member and power arms integral with the lift arm and extending from the fulcrum downward at the sides of the supporting member, a cylinder rigidly secured in the block and extending therefrom at an inclination upward toward the other end of the base member, a ram operating in the cylinder, a cross-head mounted on the outer end of the ram, and operating links adjacent the outer faces of the webs and pivoted to the cross-head and the operating arms, said cross-head being disposed above and free from said webs.

CLARENCE M. EASON.
JOSEPH J. MUELLER.